United States Patent
Burg

(10) Patent No.: US 6,631,689 B2
(45) Date of Patent: Oct. 14, 2003

(54) RECYCLED CUSHION, FINNED, AND BUSTLED AIR CUSHION ENHANCED SHIP

(76) Inventor: Donald E. Burg, 15840 SW. 84th Ave., Miami, FL (US) 33157

(*) Notice: Subject to any disclaimer, the term of this patent is extended or adjusted under 35 U.S.C. 154(b) by 0 days.

(21) Appl. No.: 09/800,298

(22) Filed: Mar. 5, 2001

(65) Prior Publication Data

US 2002/0124789 A1 Sep. 12, 2002

Related U.S. Application Data

(63) Continuation-in-part of application No. 09/412,234, filed on Oct. 4, 1999, now abandoned, and a continuation-in-part of application No. 09/388,277, filed on Sep. 1, 1999, now abandoned.

(51) Int. Cl.⁷ ................................................ B63B 1/24
(52) U.S. Cl. ...................... 114/274; 114/289; 114/67 A
(58) Field of Search ...................... 114/67 A, 274–291; 180/116–130; 440/38, 40, 42, 43, 47

(56) References Cited

U.S. PATENT DOCUMENTS

| | | | | |
|---|---|---|---|---|
| 1,412,848 A | * | 4/1922 | Dunajeff | 114/289 |
| 1,621,625 A | * | 3/1927 | Casey | 114/67 A |
| 3,127,863 A | * | 4/1964 | Tinajero | 114/313 |
| 3,141,436 A | * | 7/1964 | Cathers et al. | 180/120 |
| 3,189,114 A | * | 6/1965 | Eggington | 180/118 |
| 3,207,113 A | * | 9/1965 | Tattersall | 114/67 A |
| 3,207,246 A | * | 9/1965 | Weiland | 180/130 |
| 3,265,141 A | * | 8/1966 | Cossairt et al. | 180/130 |
| 3,272,273 A | * | 9/1966 | Lowrie | 180/130 |
| 3,438,458 A | * | 4/1969 | Mamo | 180/122 |
| 3,442,348 A | * | 5/1969 | Cockerell | 180/130 |
| 3,871,317 A | * | 3/1975 | Szpytman | 114/282 |
| 3,968,762 A | * | 7/1976 | Meyer, Jr. | 114/66.5 H |
| 4,237,810 A | * | 12/1980 | Westfall | 114/272 |

FOREIGN PATENT DOCUMENTS

| | | | | |
|---|---|---|---|---|
| DE | 1189858 | * | 3/1965 | 114/67 A |
| DE | 4412853 | * | 12/1994 | 114/56.1 |
| GB | 2141388 | * | 12/1984 | 114/56.1 |
| GB | 952263 | * | 12/1994 | 114/67 A |
| JP | 359073384 | * | 4/1984 | 114/56.1 |
| JP | 9059 | * | 1/1989 | 114/67 A |

* cited by examiner

Primary Examiner—S. Joseph Morano
Assistant Examiner—Ajay Vasudeva
(74) Attorney, Agent, or Firm—Robert J. Van Der Wall

(57) ABSTRACT

Presented is a highly efficient and stable ship concept that is at least partially supported by an artificially produced gas cushion(s). Addition of a stern bustle aft of the gas cushion(s) improves hull efficiency. Special location of water inlets for waterjet propulsors allows the inlets to take in the ship's boundary layer to thereby enhance the waterjet's efficiency. Other features of the invention include an aft stabilizer that can have trim capabilities, a forward stabilizer that can include trim capabilities and that can also provide an expansion of gas cushion area, and forward stabilizing fins that can retract into the gas cushion recess which is an advantage when operating in shallow water or near docks. A further enhancement includes water deflectors disposed mainly in a gas cushion recess(es) whereby impingement of a bow wave on such water deflectors adds to the overall lift and hence efficiency of the ship especially at low to medium speeds. Additionally, a system to recover pressurized gas that is leaving a gas cushion(s) and recycle it back into the gas cushion(s), after passing through a repressurizing system, is also offered. Further, hull efficiency is improved and air cushion blower power requirements are reduced by narrowing the ship's beam below the waterline aft.

65 Claims, 7 Drawing Sheets

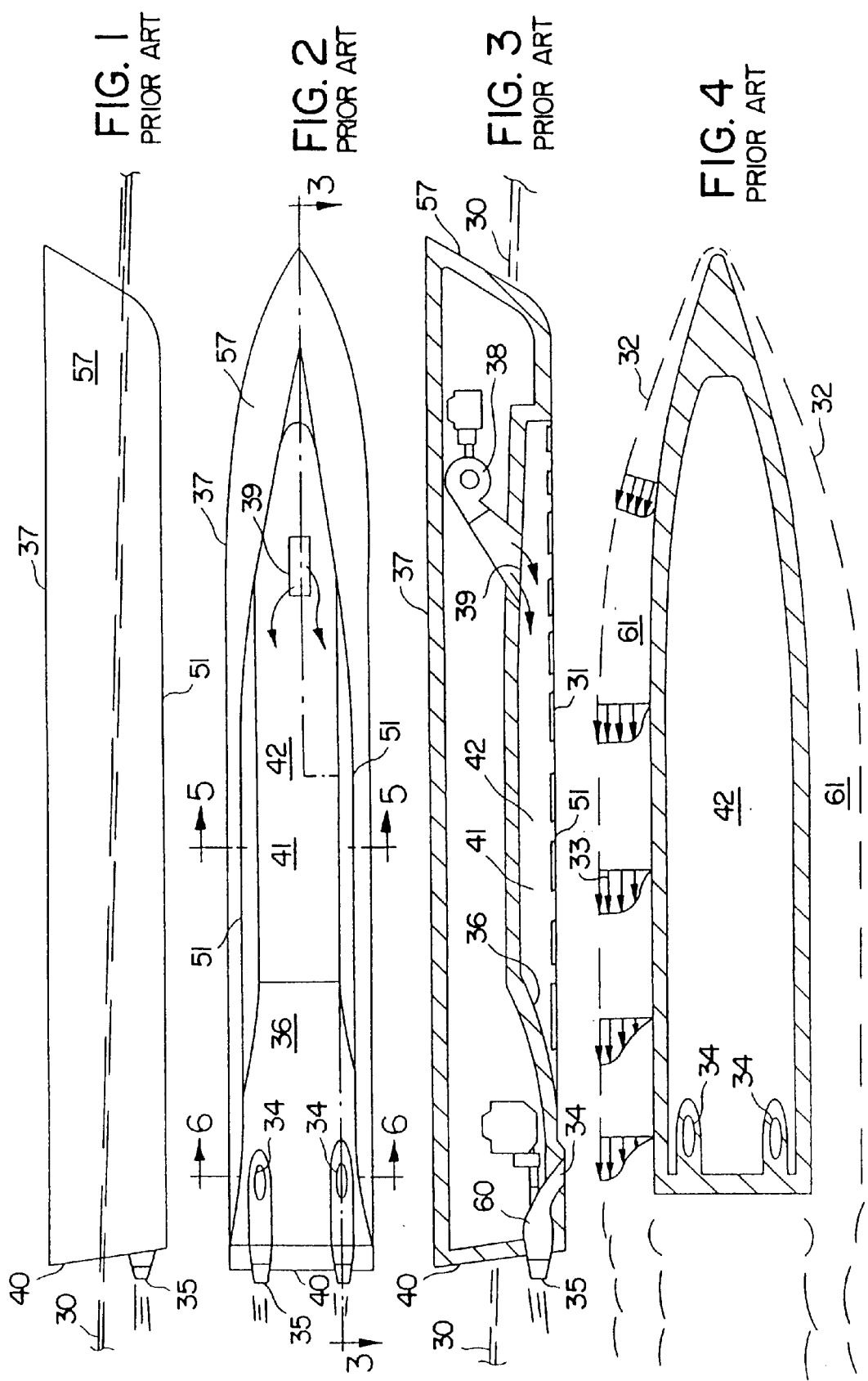

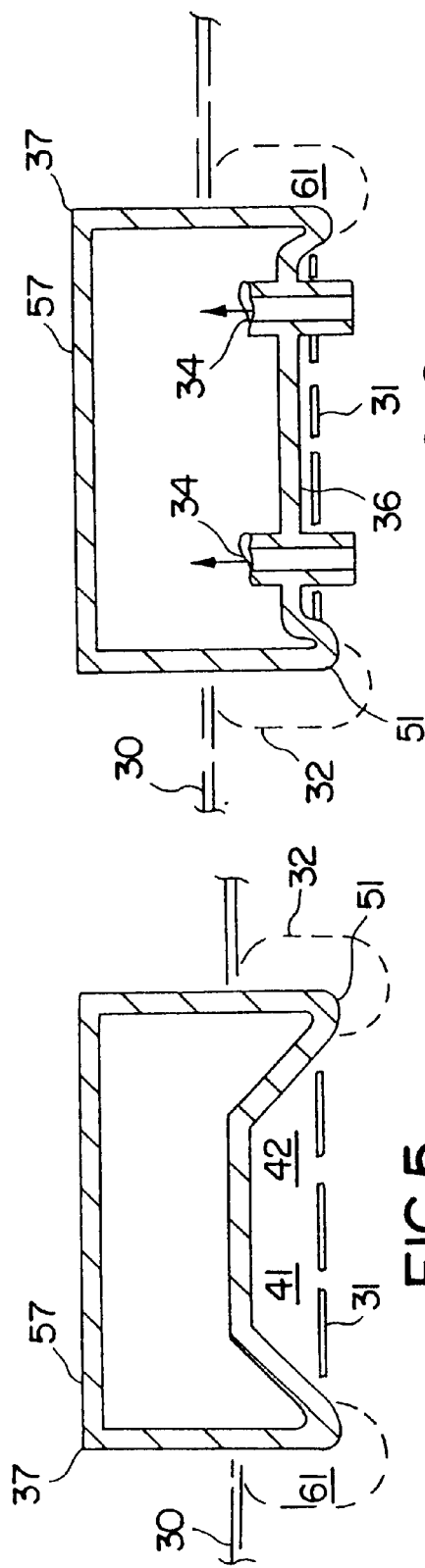
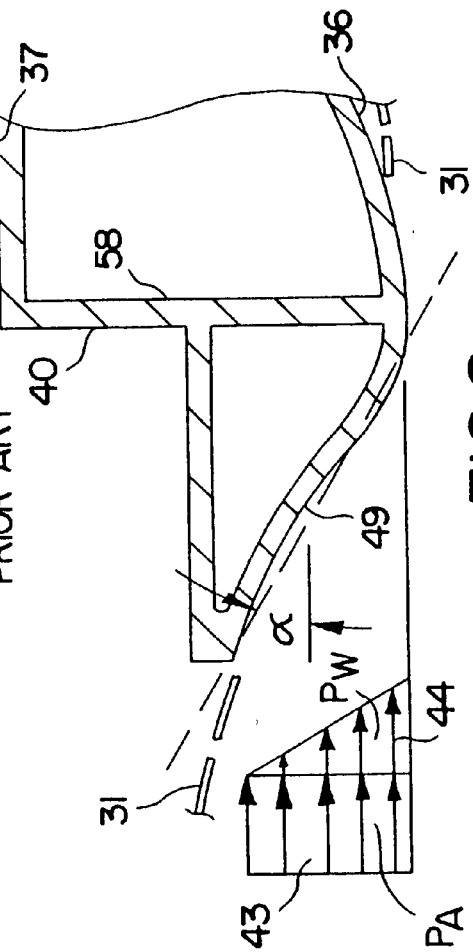
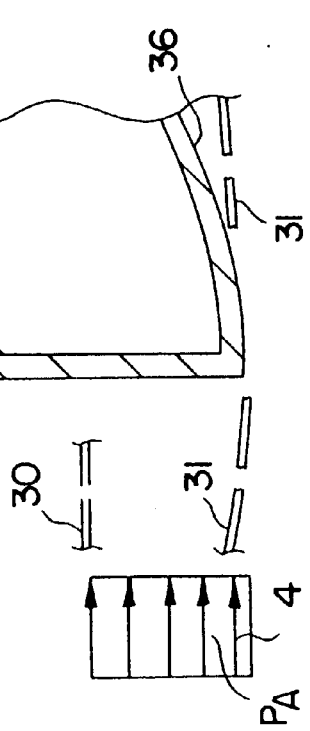
FIG. 5 PRIOR ART
FIG. 6 PRIOR ART
FIG. 7 PRIOR ART
FIG. 8

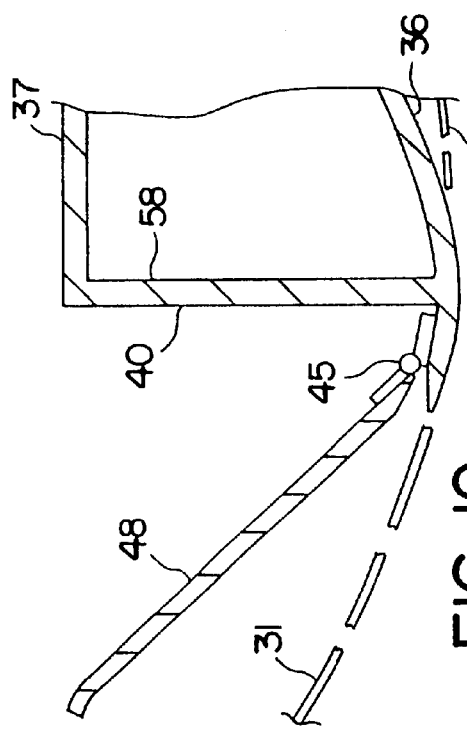
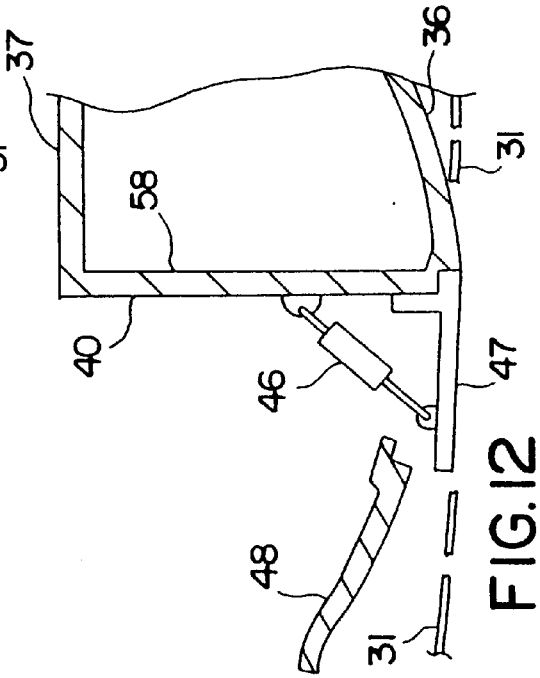
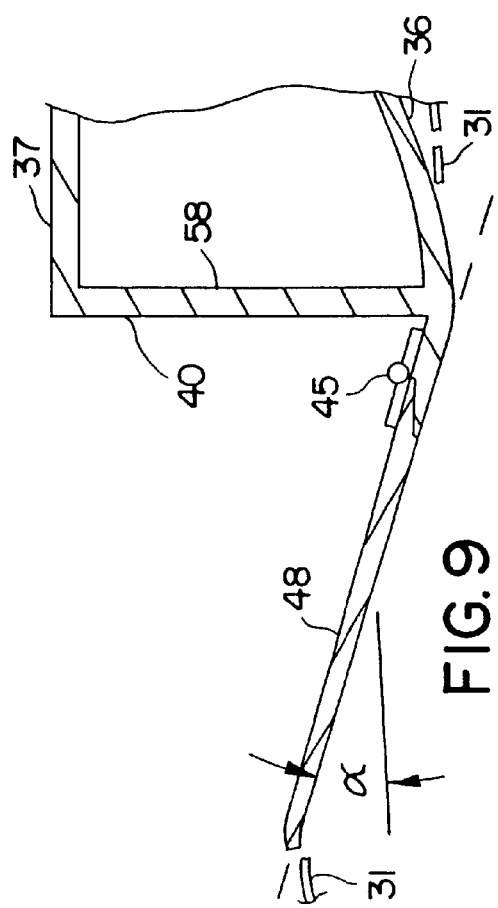
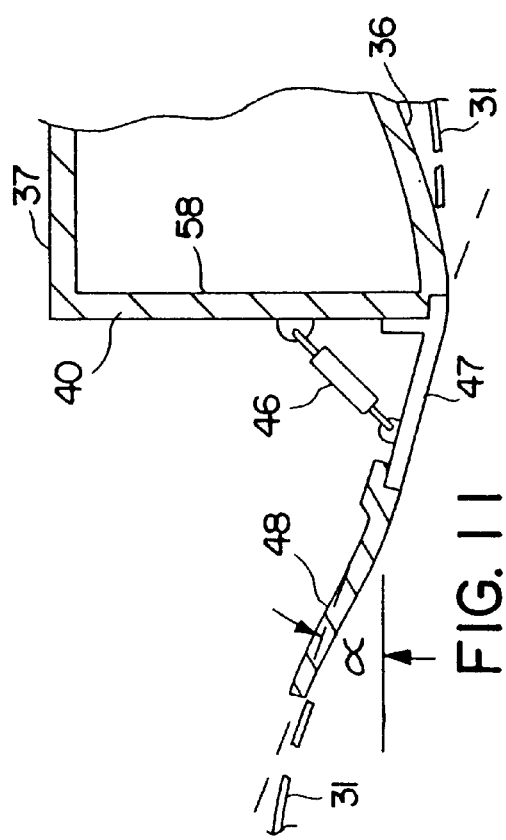

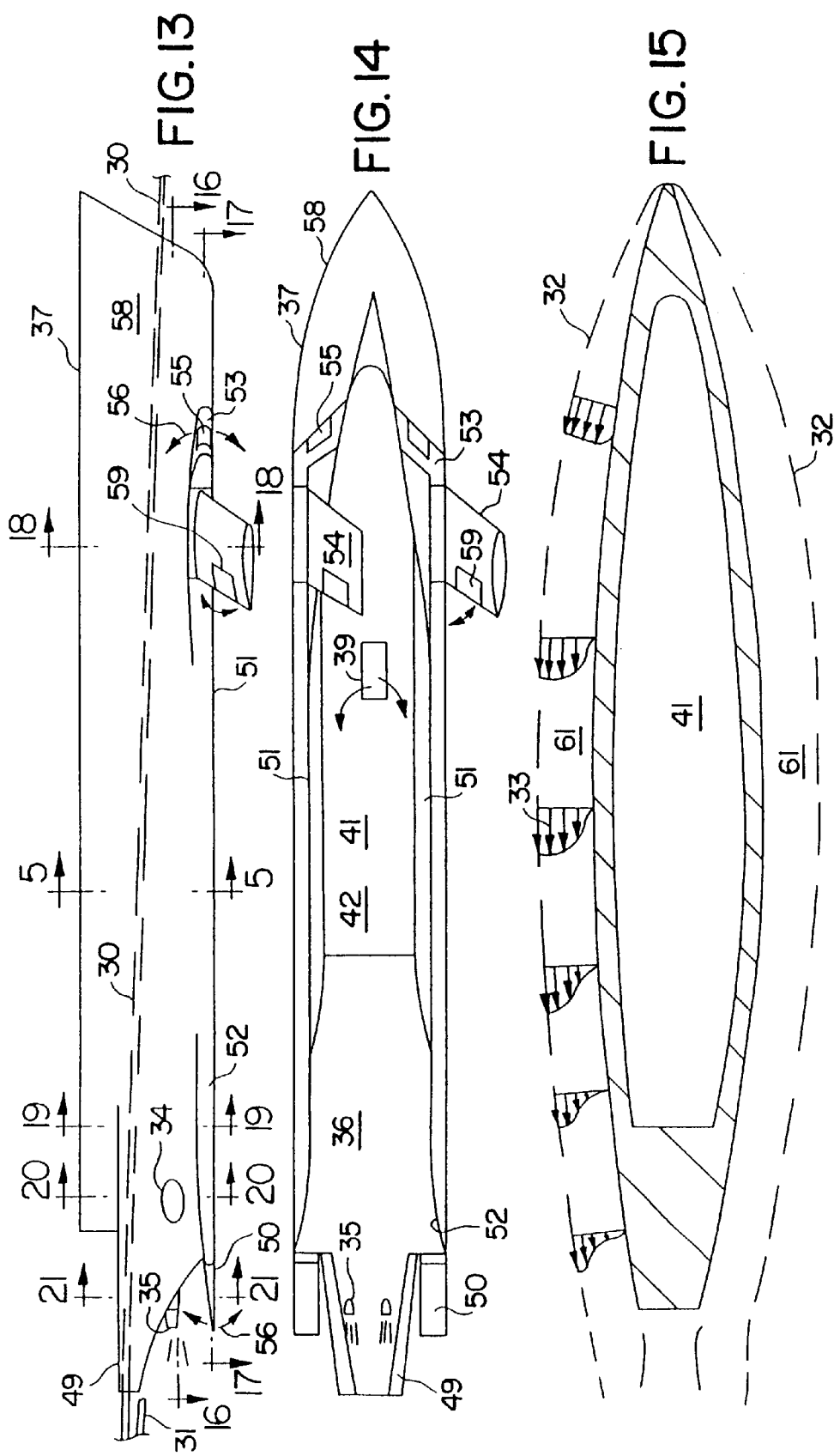

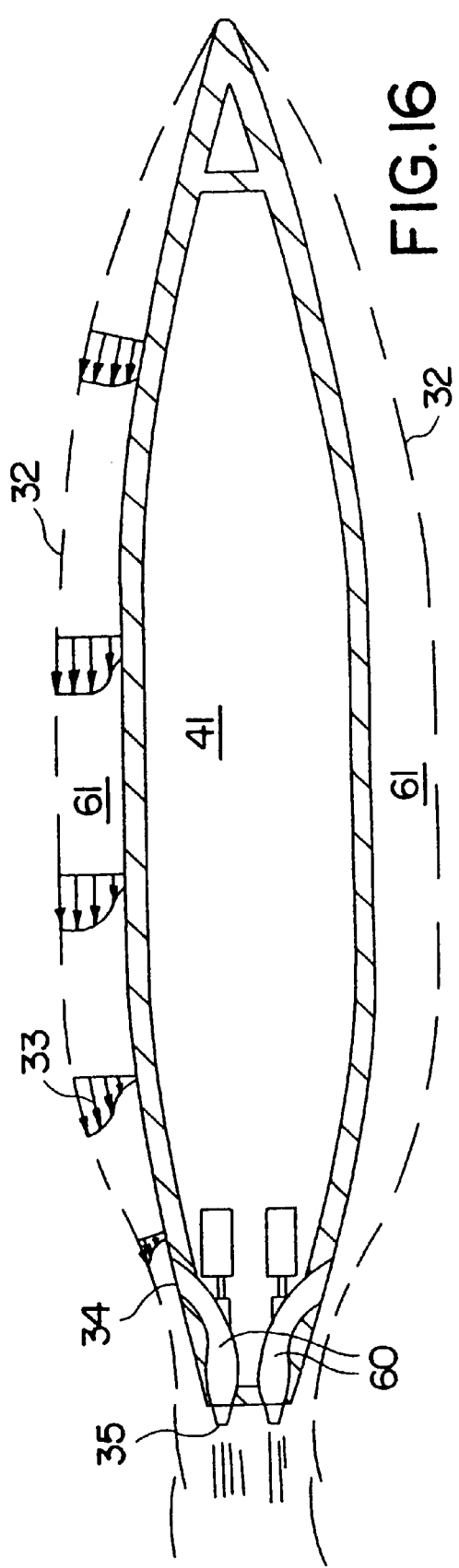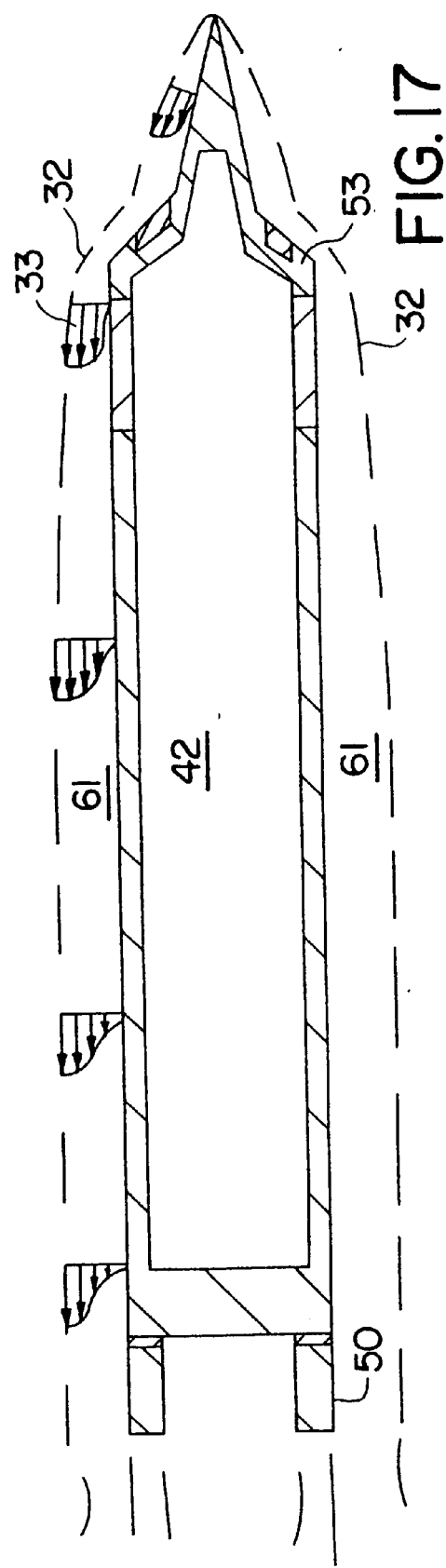

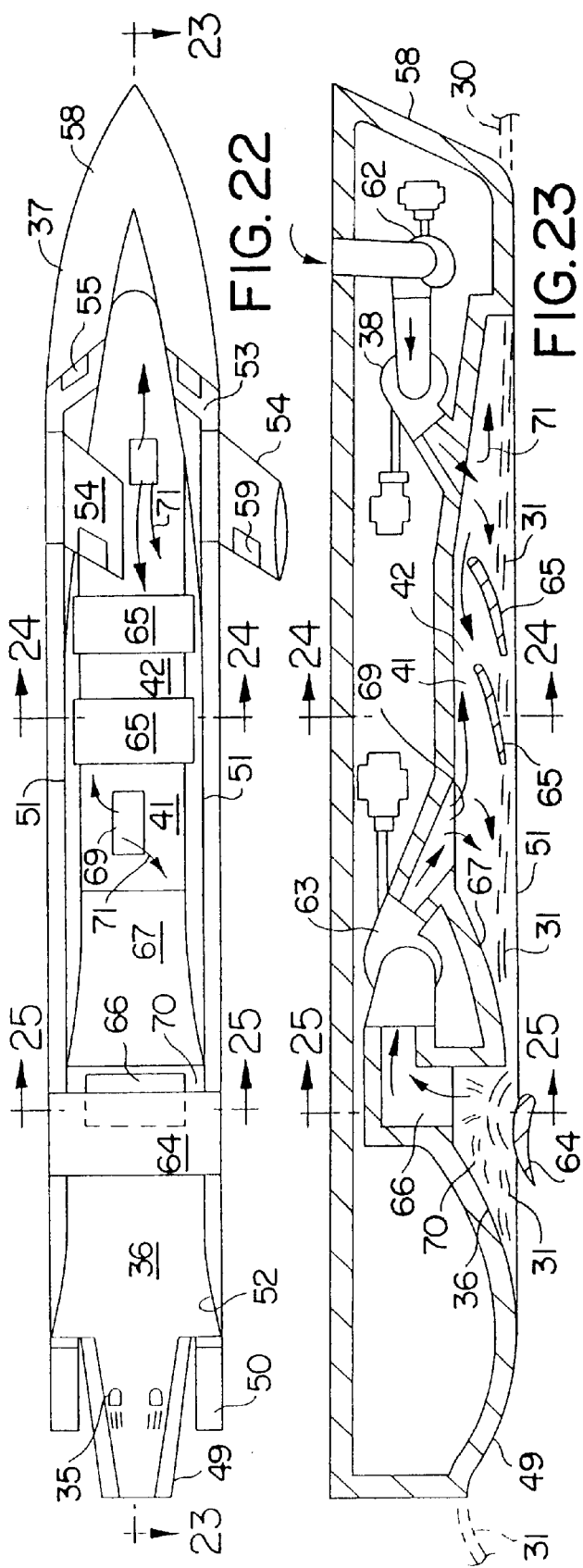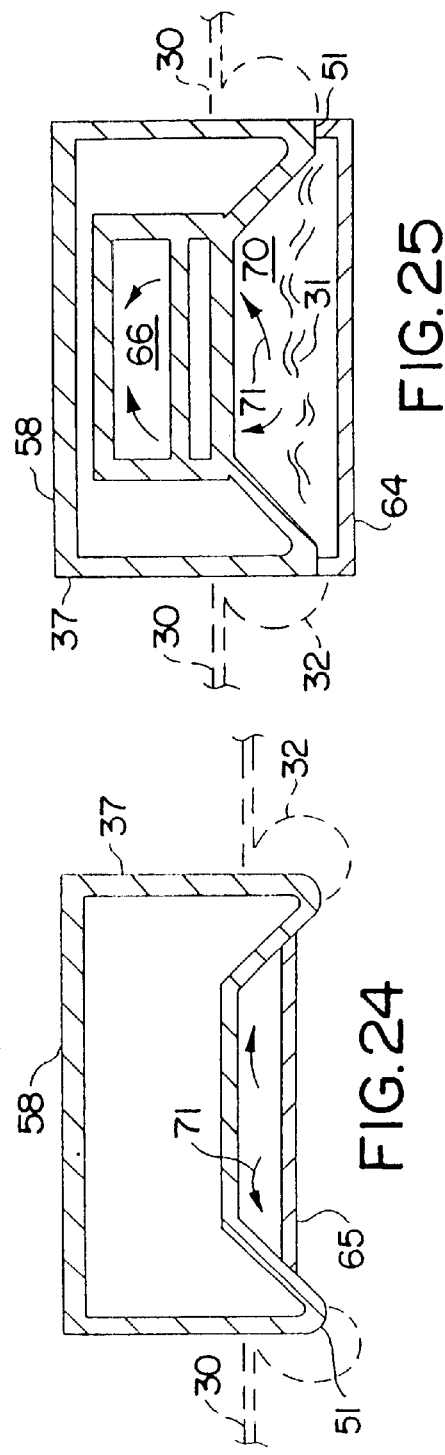

RECYCLED CUSHION, FINNED, AND BUSTLED AIR CUSHION ENHANCED SHIP

CROSS REFERENCE TO OTHER APPLICATIONS

This application is a continuation-in-part to applicant's earlier application: Ser. No. 09/388,277 filed Sep. 1, 1999 now abandoned and Ser. No. 09/412,234 filed Oct. 4, 1999 now abandoned.

BACKGROUND OF THE INVENTION

There have been numerous designs of boats or ships that operate while at least partially supported by artificially pressurized air cushions. Examples include the hovercraft that has full periphery flexible seals and as such is amphibious, the generic "SES" (an acronym of Surface Effect Ship) that has catamaran sidehulls with the air cushion disposed between the sidehulls and restrained by the sidehulls and flexible seals fore and aft that span the distance between the sidehulls, and applicant's prior patents related to partially air supported boats or ships. U.S. Pat. No. 5,176,095 is an example of applicant's prior work on partially air-supported boats or ships. The instant invention is applicable to both mono-hull and multi-hull ships.

The instant invention that is the subject of this application discloses significant advances in the technology of partially air supported ships. While applicable to all size and use ships, this new technology is most appropriately applied to larger vessels of either mono-hull or multi-hull configurations. Some of the advantages are a significant reduction in propulsor power requirements and a great increase in stability. Applicant has coined the acronym "ACES" which is derived from the descriptive term "Air Cushion Enhanced Ship" to describe this new technology. The term ACES is used when discussing the instant invention in this application.

The instant invention offers advancements over applicant's earlier prior art inventions as well as all other prior art. These advancements are discussed in some detail in the following sections.

SUMMARY OF THE INVENTION

The object of the instant invention is to provide a marine vehicle that is at least partially supported by an artificially pressurized gas cushion wherein such vessel or ship has superior efficiencies to other more conventional ships over a wide range of operational speeds.

It is a related object of the invention that the instant invention ship may be of mono-hull or multi-hull configuration.

A related object of the invention is that addition of a stern bustle allows fluids, gas and/or water, flowing aft of the transom or stern of the ship to rise, while still in contact with the ship, to a level at least approaching the level of a calm sea surface waterline surrounding the ship.

It is a further related object of the invention that fluids rising while in contact with a stern bustle shall exert a forward force on the ship.

It is a directly related object of the invention that the stern bustle shall be in contact with an aft gas cushion seal of the ship.

It is yet another directly related object of the invention that gases exiting the aft gas cushion seal and water will be the fluids passing under the stern bustle.

It is yet another object of the invention that the stern bustle can start to taper inward going aft from a point forward of the stern or transom of the ship.

It is another related object of the invention that the stern bustle may be at least in part curvilinear on its lower surface.

It is a further related object of the invention that the stern bustle may taper inward going aft.

It is a directly related object of the invention that the stern bustle may be truncated at its aft end.

It still another directly related object of the invention that sides of the stern bustle may come together at its aft end.

It is yet another object of the invention that the stern bustle may rise, going aft from the stern of the ship, by an average angle of less than 18 degrees to horizontal.

It is another object of the invention that the stern bustle may rise, going aft from the stern of the ship, by an average angle of less than 12 degrees to horizontal.

It is still another object of the invention that the stern bustle may rise, going aft from the stern of the ship, by an average angle of less than 9 degrees to horizontal.

It is a further object of the intention that the improved marine vehicle's aft underwater side portion can taper inward going aft.

It is a directly related object of the invention that said aft underwater side portion of said improved marine vehicle can taper inward going aft over at least fifteen percent of a waterline length of said improved marine vehicle.

It is a further directly related object of the invention that said aft underwater side portion of said improved marine vehicle can taper inward going aft over at least twenty-five percent of a waterline length of said improved marine vehicle.

It is a yet a further directly related object of the invention that said aft underwater side portion of said improved marine vehicle can taper inward going aft over at least thirty-five percent of a waterline length of said improved marine vehicle.

It is an object of the invention that the instant inventive ship may be propelled by waterjet type propulsors whereby said propulsors obtain at least a portion of their inlet water from a boundary layer next to the ship thereby improving the thrust output of the propulsor.

It is a directly related object of the invention that a waterjet inlet may be at least partially disposed on the side of the improved marine vehicle or ship.

It is related object of the invention that the side of the improved marine vehicle that waterjet inlet will be disposed in will be, on average as seen in vertical transverse planes of the improved marine vehicle, more vertical than horizontal.

It is yet another related object of the invention that a waterjet inlet may be at least partially disposed in a lower portion of a sidewall of the ship that makes up part of a periphery of the ship's supporting gas cushion such that said waterjet inlet absorbs inlet water from a boundary layer disposed next to the keel of the sidewall.

It is a directly related object of the invention that the waterjet inlet will take in less than twenty percent of the thickness of the boundary layer proximal said waterjet inlet.

It is a directly related object of the invention that the water et inlet will take in less than thirty percent of the thickness of the boundary layer proximal said waterjet inlet.

It is a directly related object of the invention that the waterjet inlet will take in less than fifty percent of the thickness of the boundary layer proximal said waterjet inlet.

It is another object of the invention that an aft stabilizer fin may be disposed lower than a portion of a stern bustle of the ship and extend outward from the side of the ship.

It is a directly related object of the invention that said aft stabilizer fin can be, at least in part, airfoil shaped.

It yet another related object of the invention that said aft stabilizer fin can include a flap-like member that is capable of trimming the boat.

It is also an object of the invention that a forward stabilizer can extend outward from the hull.

It is a directly related object of the invention that said forward stabilizer be at least partially airfoil shaped.

It is a related object of the invention that said forward stabilizer can include a forward flap-like member that is capable of trimming the ship.

It is yet another directly related object of the invention that the forward stabilizer can include a portion of the supporting gas cushion recess in its underside to thereby enlarge the water contacting area of the gas cushion.

It is a further object of the invention that forward stabilizing fins can extend outward beyond the beam of the hull to thereby add to stability of the ship.

It is a directly related object of the invention that the forward stabilizing fins can angle downward much like the pectoral fins on a shark.

It is a further directly related object of the invention that such forward stabilizing fins be at least partially airfoil shaped.

It is a further related object of the invention that the forward stabilizing fins can be retracted either vertically toward the sides of the ship or downward and inward so that they can be stored, at least in the main, within the confines of the gas cushion recess in the underside of the marine vehicle.

It is yet another related object of the invention that the forward stabilizer fins can include flaps capable of trimming the ship.

It is another object of the invention that the pressurized gas in the supporting gas cushion(s) can be recycled through a gas pressurization means and reinjected into any of the gas cushion(s) to thereby increase the efficiency by decreasing power requirements of the blower pressurizing means.

It is a directly related object of the invention that the gas pressurization means can include a powered blower.

It yet another related object of the invention that the pressurized gas cushion gas that is to be recycled is taken from aft of a gas cushion seal member.

It is another directly related object of the invention that the pressurized gas cushion gas that is to be recycled is taken from between two or more gas cushion seal members.

It is yet another directly related object of the invention that an underwater member such as a hydrofoil can be used to direct gas that is suspended in the water proximal the gas cushion(s) upward into a recess collection means between two or more gas cushion seal members thereby helping to separate the gas entrained in the water from the water.

It is still another related object of the invention that gas cushion seals can be disposed fore and aft of a chamber that is used to separate pressurized gas from water flowing under the advanced marine vehicle.

Another object of the invention is that water deflector members can be arranged transversely across a gas cushion recess.

It is a directly related object of the invention that such water deflector members can be acted on by water waves below the marine vehicle's hull to thereby add lifting forces to the hull.

It a further directly related object of the invention that pressurized gas can pass through or over the water deflector members to thereby have formed essentially a connected continuous gas cushion on both sides of a water deflector member.

The invention will become better understood upon reference to the drawings and the detailed description of the invention which follow in which:

BRIEF DESCRIPTION OF THE DRAWINGS

FIG. 1 shows the side or profile view of a prior art boat.

FIG. 2 presents a bottom plan view of an air cushioned boat hull similar to that described in applicant's earlier patents as mentioned in the previous section of this application titled BACKGROUND OF THE INVENTION. Note that while a mono-hull variant is shown here to simplify the drawings that all manner of mono-hull, outrigger hull, and multi-hull configurations are applicable to the instant invention's concepts.

FIG. 3 presents a cross-section, as taken through line 3—3 of FIG. 2, that shows a blower system, a supporting gas cushion, and a waterjet drive system.

FIG. 4 shows the water contacting surfaces, as seen when the boat is operating in a calm sea with its gas cushion pressurized, of the prior art ship presented in FIGS. 1 through 3. The boundary layer adjacent to the hull is illustrated in FIG. 4 also.

FIG. 5 is a cross-section, as taken through line 5—5 of FIG. 2, that presents a section of the prior art ship's hull at midship.

FIG. 6 shows a cross-section, as taken through line 6—6 of FIG. 2, that details a cross section of the ship's hull in way of the stern seal and waterjet inlets.

FIG. 7 is a centerline partial cross section taken at the stern of a prior art ship as was presented in FIGS. 1 through 3. This shows the stern seal and the depressed water leaving aft of the stern seal. A portion of the calm sea surface waterline next to the outside of the ship's hull is shown for reference. Important to note here is the air pressure that is acting on the stern or transom of the boat.

FIG. 8 is the same centerline partial cross section as presented in FIG. 7 but with the important addition of the bustle stern that is a part of the instant invention. Note that the water follows the contour of the stern bustle so that there is water pressure acting as a forward force against the stern bustle. Comparing the effect of the ambient air pressure on the stern of the prior art shown in FIG. 7 and the instant invention's addition of water pressure shows an added forward thrust benefit to the instant invention.

FIG. 9 presents a centerline cross-section of a trimmable variation of the instant invention's stern bustle. In the case of FIG. 9 it is trimmed down and would be operating much as the version of the instant invention presented in FIG. 8.

FIG. 10 is the same view and configuration as presented in FIG. 9 but with the water contacting flap-like portion trimmed up so that it is not in water contact.

FIG. 11 is another version of a variable stern bustle like that shown in FIGS. 9 and 10 but with a trimmable forward member.

FIG. 12 shows the same version of a variable stern bustle as presented in FIG. 11 but with the trimmable forward member trimmed down to direct water away from the aft bustle portion. The reason for consideration of these systems shown in FIGS. 9 through 12 is for craft that have a very steep angle of attack and hence a deeply submerged stern when operating at low speed, say, 10–15 knot "Hump" but a low angle of attack at high speeds.

FIG. 13 is a profile view of a preferred embodiment of the instant invention. Shown are a forward stabilizer, forward fin that actually acts as a pectoral fin here, side boundary layer absorbing waterjet inlet, aft stabilizer and trim tab, and stern bustle.

FIG. 14 is a bottom plan view of the instant invention that was presented in FIG. 13. Note that the starboard side forward fin is retracted into the gas cushion recess here.

FIG. 15 shows the water contacting surfaces, as seen in a calm sea surface waterline with the boat moving forward and with the gas cushion pressurized, of the instant invention presented in FIGS. 13 and 14. Note that the water-contacting surface is greater here than is the prior art case presented in FIG. 4. However, even with the higher wetted area drag there is an overpowering benefit of the forward force generated by water pressure on the stern bustle of the instant invention. Note that the boundary layers depicted in the Figures of the application are not to scale. For an example of the actual size of a typical boundary layer consider that a 1,000×170-foot ship would have a boundary layer at its stern of about eight feet at 40 knots.

FIG. 16 presents a cross-section, as taken through line 16—16 of FIG. 13, that shows the preferred embodiment side inlets of waterjet propulsors. Note that these waterjet inlets are taking in much of the boundary layer adjacent to said waterjet inlets. This results in an enhanced thrust output for the waterjets since the hull has already brought the waterjet inlet water up to some velocity. Thrust is a function of the momentum added by the waterjets since: Waterjet Thrust=Mass of Water×Acceleration of Water. Comparing waterjet inlet water taken from the freestream to that available from the boundary layer, we see that, at the same power level, there is greater Mass of Water Flow for the freestream case since that case offers a greater water pressure at the waterjet's rotor. However, that is more than made up for by the fact that the waterjet taking in large amounts of boundary layer exerts more acceleration. In our case of a 1,000-foot long ship, the advantage of the waterjet taking in large amounts of boundary layer water can be a thrust enhancement of 30 percent or more.

FIG. 17 is a cross-section, as taken through line 17—17 of FIG. 13, that shows that one of the effects of the forward stabilizer can be an increase in gas cushion area forward.

FIG. 21 is a cross-section, as taken through line 21—21 of FIG. 13, that gives the preferred shape of the stern bustle in aft of the transom or stern of the hull. Note that while a inward tapering stern bustle is shown in the drawings that it is not necessary to taper the stern bustle inward to achieve the desired forward thrust of water pressure on the stern bustle. The sides of the ship's hull can remain full width or thereabouts from sheer to keel, such as is illustrated in FIG. 5, all the way to the aft end of the stern bustle if such is a desired objective for carrying cargo, passengers, or the like.

FIG. 22 is a bottom plan view of a preferred embodiment of the instant inventive marine vehicle hull that is similar to that presented in FIG. 14. However, there are important features that add substantial improvements. The first involves water deflectors across the gas cushion forward that add to performance. This is particularly so during low to medium speed operation when a bow wave rises up in the gas cushion. By doing so, such a bow wave impacts the water deflectors thereby adding high efficiency hull lift forces. Further, and very importantly, a gas separation chamber has been added between two gas cushion seals. The benefit of this is that is entrained in the water below the gas cushions is separated in the separation chamber and then recycled through a powered blower. This substantially reduces the amount of blower power required by the ship.

FIG. 23 is a centerline cross-sectional view, as taken through line 23—23 of FIG. 22 that shows a means to recycle gas cushion gas. In this instance the pressurized gas from a forward gas cushion, after passing under a seal member, is passed back through a powered blower that adds energy in the form of pressure. The repressurized gas is then resubmitted to a forward gas cushion portion. There is great advantage to doing so since a tremendous reduction in overall blower power is realized. A water upsetting means, such as a hydrofoil that is shown, is used to help agitate and thereby separate the air entrained in the water above it in the gas separation chamber. Also shown are water deflectors as were described in some detail under the preceding description of FIG. 22.

FIG. 24 is a transverse cross-section, as taken through line 24—24 of FIGS. 22 and 23 that shows a preferred disposition of a water deflector as inset into a gas cushion.

FIG. 25 is a transverse cross-section, as taken through line 25—25 of FIGS. 22 and 23, that illustrates a gas separation chamber and hydrofoil that is used to upset or agitate water and direct same into the gas separation chamber to thereby help separate entrained air from the water below the gas cushion.

DETAILED DESCRIPTION

Figure 18:
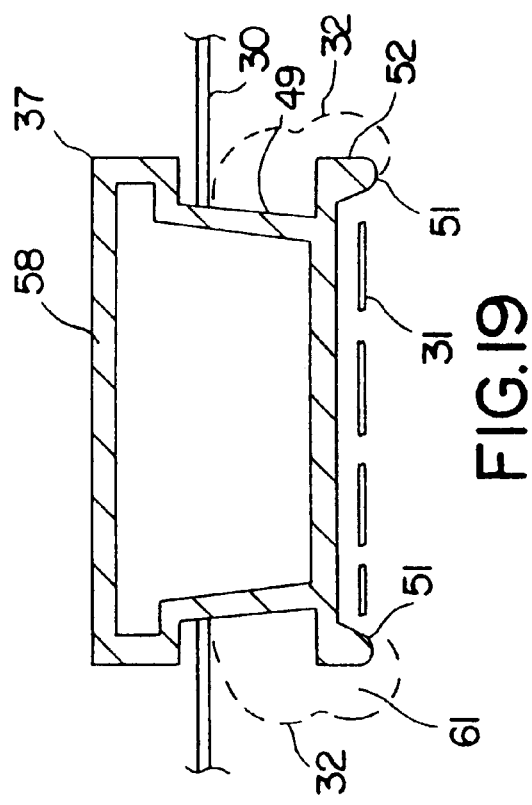
FIG. 18 is a transverse cross-section, as taken through line 18—18 of FIG. 13, that shows a section of the forward stabilizer and stabilizer fin. Note that one of the stabilizer fins is retracted into the gas cushion recess in this illustrative Figure.

FIG. 1 is a profile view of a prior art air cushioned boat or ship 57 showing a calm sea waterline 30, deck sheer 37, waterjet discharge 35, sidekeel 51, and stern or transom 40. This prior art partially air cushion supported ship 57 has a dry transom. As such, only air pressure at sea level pressure acts in a forward direction on the transom 40.

FIG. 2 is a bottom plan view of the prior art air cushioned ship 57 showing a gas cushion recess 41, gas cushion 42, blower discharge 39, gas cushion stern seal 36 sidekeels 51, waterjet propulsor inlets 34, and waterjet propulsor discharges 35.

FIG. 3 presents a cross-section, as taken through line 3—3 of FIG. 2, that shows the blower 38 and an active waterline 31 that occurs with the gas cushion 42 of the prior art air cushioned ship 57 pressurized with gas. Also shown is one of the waterjet propulsors 60.

FIG. 4 is a bottom plan view that shows the amount of hull that is wetted when operating at the waterline 30 depicted in FIG. 1. Most importantly, FIG. 4 illustrates the boundary layer 61 and the boundary layer outline 32 that the hull sees when traveling forward at cruise speeds. The boundary layer velocity arrows 33 give some indication of the distribution of boundary layer next to the ship. Note that the water next to the ship is almost up to ship speed adjacent to the hull sides. More boundary layer water is accelerated toward ship speed the further aft it is measured on the hull. This is because the hull is simply dragging an immense amount of water along with it. The boundary layer shown is not to scale. For example, a 1,000-foot boat would have a boundary layer of about eight feet at the stern when traveling at cruise speed.

FIG. 5 is a cross-section view, as taken through line 5—5 of FIG. 2, that shows a typical midship section of the prior art air cushioned ship 57. Note the boundary layer outlines 32 around the wetted portions of the hull.

FIG. 6 presents a cross-section, as taken through line 6—6 of FIG. 2, that shows the waterjet propulsor inlets 34 as disposed through the gas cushion recess stern seal 36 of the prior art air cushioned ship.

FIG. 7 is a partial cross-section, as taken through the centerline of the prior art air cushioned ship 57, that shows the active waterline 31 as it intersects the gas cushion stern seal 36 and then as it is shaped aft of the transom 40. The elevation of the calm sea surface waterline 30 at the side of the ship is shown for reference. Note that the forces acting on the transom 40 are sea level ambient air pressure forces. This is shown by the PA pressure arrows 43.

FIG. 8 is a partial cross-section, as taken through the centerline of the preferred embodiment of the instant invention ACES 58, that shows addition of the stern bustle 49. Note that the active waterline 31 is now following the stern bustle 49 upward so that there is a forward force from water pressure on the ship. The PA sea level pressure is the same in FIG. 7 and FIG. 8 so there is a canceling effect of the PA force. However, with reference to the Pw pressure force arrows 44, it can be seen that a large forward pressure force can be realized-this is especially so for a large ship. For example, a 1,000×170 foot ACES would see the transom as deep as 20 feet when at cruise speeds. There is more wetted area friction and some aft forces related to turning the water; however, the net result is a positive forward force.

Also to be noted in FIG. 8 is the angle of rise $\alpha$ of the underside of the stern bustle 49. The average rise of the stern bustle underside is optimum at an angle of about nine degrees. However, for purposes of this application, it is considered that the angle $\alpha$ should be less than 18 degrees if possible with 12 degrees a more desired number and less than 9 degrees preferred. Note also the curvilinear shape of the underside proximal the aft end of the gas cushion stern seal 36. That curvilinear shape directs the water flowing under it to turn upward and adhere to the surface of the stern bustle 49. Note that the stern bustle 49 can be the full width of the ACES if desired. Note also that the stern bustle can be applied to more conventional SES craft that have a flexible bag like gas cushion stern seal. In such a flexible stern seal situation it is probably best to have the stern bustle as an inflatable member also although a fixed structure stern bustle can be applied. In any case, use of fixed or movable, in relation to the ship, gas cushion aft seals can be accommodated by the instant invention.

FIGS. 9 and 10 present an alternative retractable stern bustle concept. In FIG. 9 this device is down and in full water contact thereby acting in a similar manner to the stern bustle presented in FIG. 8. A hinge 45 is the preferred means of connecting the aft flap-like portion 48. In FIG. 10 the aft flap-like portion 48 is raised so that it does not have water contact. The reason for offering such a variable stern bustle concept is for an application whereby a boat or ship has a difficult time transiting a high drag low speed condition where its stern or transom is dry but deeply submerged. As such one would want the added thrust available from the wetted stern bustle. However, once at high cruise speed the added wetted area drag of the stern bustle may not be wanted. Hence, the reason for the ability to use or uncouple the stern bustle.

FIGS. 11 and 12 present another way to accomplish what was done in the concept presented in FIGS. 9 and 10. In this case, an actuator 46 raises or lowers a flexible flap-like member 47 to couple or uncouple a stern bustle aft section 48.

FIG. 13 presents the preferred embodiment of the instant invention ACES 58. This preferred embodiment includes a stern bustle 49, waterjet inlets 34 that are disposed in sides of the ship so that they can absorb boundary layer water, an aft stabilizer 52, aft stabilizer trim flap 50, forward stabilizer 53, forward stabilizer trim device 55, side fins 54 that are preferably retractable, and side fin trimmable flaps 59. Note that the forward stabilizer 53 and aft stabilizer 52 are normally underwater during cruise speed operation. These forward and aft stabilizers are preferably at least in part airfoil shaped. This concept makes for a very stable marine platform over its entire operating range.

FIG. 14 is a bottom plan view of the instant invention ACES 58 in its preferred embodiment with all the bells and whistles for maximum performance. Note that an option is to have the forward stabilizer 53 add to the air cushion surface area by having part of the air cushion 42 extend outward into a recess built into its underside. Also, one of the retractable fins 54 is shown retracted into the gas cushion recess 41 in this Figure which offers advantage when docking and/or operating at low speeds in shallow water.

Further items to note in FIG. 14 are that the stern bustle 49 tapers inward going aft which provides less water resistance and hence less drag. Also, the stern bustle 49 is optionally truncated here. While preferred, neither the tapering nor the truncating of the stern bustle 49 are requirements of the instant invention. The stern bustle 49 can follow the full hull midship beam at the sheer 37 all the way to the aft end of the stern bustle if desired. Alternatively, the stern bustle 49 can terminate at a point at its aft end.

FIG. 15 presents a bottom plan view showing the water contacting surfaces of the ACES 58 show in FIGS. 13 and 14. While the wetted surface area is greater than that of the prior art air cushion ship that was presented in FIG. 4, the forward thrust benefits that derive from having the water follow the stern bustle upward exceeds any wetted area drag penalties.

FIG. 16 presents a cross section, as taken through line 16—16 of FIG. 13, that shows the waterjet inlets 34. When the waterjet propulsors 60 are propelling the ship forward, the waterjet inlets 34 draw in much of the boundary layer 61 next to sides of the ship. As this boundary layer 61 has been accelerated forward by the ship, there is a noticeable improvement in performance of the waterjet propulsors 60. For a given waterjet power level the waterjet must accelerate the water more thereby creating a greater momentum change which results in an enhanced thrust value.

The thrust of the waterjets is calculated by the formula:

$$\text{Waterjet Thrust} = \text{Mass Flow} \times (\text{Velocity}_{Jet} - \text{Velocity}_{Inlet})$$

Examination of the Waterjet Thrust equation shows that the lower value of VelocityInlet that is obtained by taking in the boundary layer pays big dividends. Assuming an ACES speed of 40 knots and no boundary layer would normally yield a Propulsive Coefficient for the waterjet propulsor of about 65 percent. By taking in the thick high-energy boundary layer associated with a large ACES, such as our 1,000-foot example, a Propulsive Coefficient (P.C.) of 85 percent can be expected. Obviously, a waterjet inlet placed in the bottom of a similar size displacement hull operating at the same speeds would see the same efficiency advantages. What is unique about the instant invention's boundary layer waterjet inlets is that they are disposed in the sides of the hull rather than the bottom of the ACES where its gas cushions are located. This allows the waterjet inlets 34 to take in boundary layer water and hence increase waterjet propulsor efficiency.

FIG. 17 is a cross-section, as taken through like 17—17 of FIG. 13, that shows the shape of the gas cushion 42 in that plane. Note that the gas cushion 42 expands outwardly thereby making a larger cushion area in way of the forward stabilizers 53 in this preferred embodiment of the invention.

FIG. 18 is a cross-section, as taken through line 18—18 of FIG. 13 that shows the forward fins 54 with one of such fins shown retracted into the gas cushion recess 41.

Figure 19:
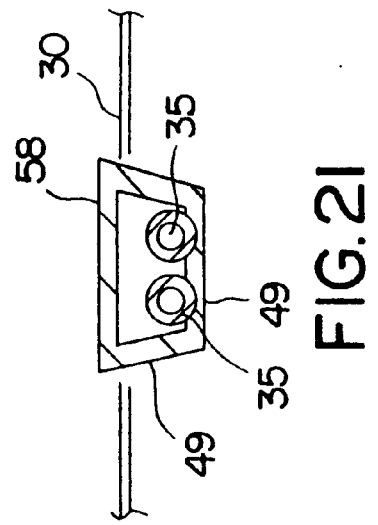
FIG. 19 presents a cross-section, as taken through line 19—19 of FIG. 13, that shows portions of the preferred embodiment aft stabilizer in way of where the aft portion of the hull, in its preferred embodiment, starts to tuck inward going toward the stern.

FIG. 19 presents a cross-section, as taken through line 19—19 of FIG. 13, that shows the hull shape forward of the stern bustle. Note that it has tapered inward below the hull sheer 37 in this preferred embodiment of the invention. Such tapering inward of the hull sides reduces resistance of the ACES 58.

Figure 20:
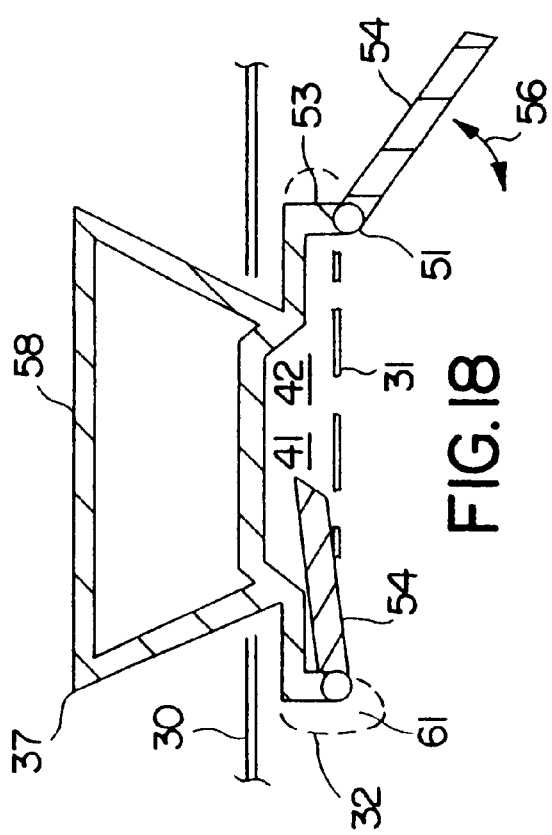
FIG. 20 is a cross-section, as taken through line 20—20 of FIG. 13, that shows the hull in way of the side waterjet inlets.

FIG. 20 is a preferred cross-section, as taken through line 20—20 of FIG. 13, that Illustrates how the waterjet inlets 34 have drawn in the boundary layers 61 on the sides of the hull adjacent to said waterjet inlets 34.

Figure 21:
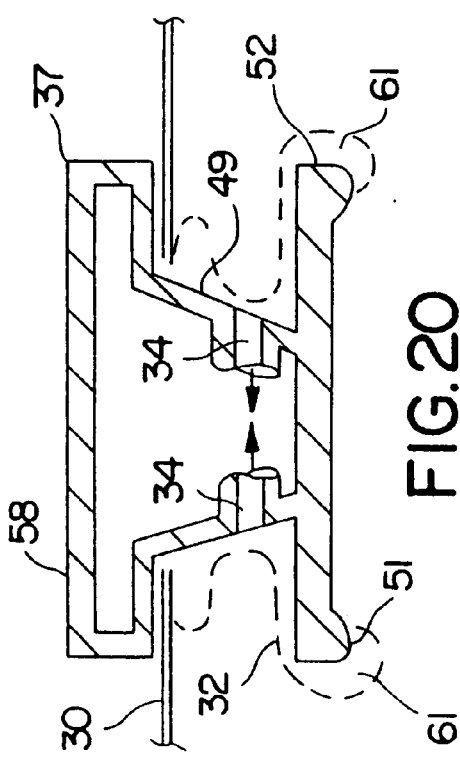

FIG. 21 gives a view of a cross-section, as taken through line 21—21 of FIG. 13, that shows the stern bustle 49 in way of the waterjet discharge nozzles 35.

FIG. 22 is a bottom plan view of a preferred embodiment of the instant inventive marine vehicle hull 58 that is similar to that presented in FIG. 14. However, there are important features that add substantial improvements. The first involves water deflectors 65 across the gas cushion forward that add to performance. This is particularly so during low to medium speed operation when a bow wave rises up in the gas cushion recess 41. By doing so, such a bow wave impacts the water deflectors 65 thereby adding high efficiency hull lift forces. The second is a means to separate entrained gas from water in a gas separation chamber 70. The separated gas, while still pressurized, is then reenergized by a powered blower and reinjected into a supporting gas cushion. This is described in greater detail in the following discussion about FIG. 23.

FIG. 23 is a centerline cross-section, as taken through line 23—23 of FIG. 22 that shows a means to recycle gas cushion gas. A gas separation chamber 70 has been added between two gas cushion seals 36, 67. The benefit of this is that gas that is entrained in the water below the gas cushions is separated in the separation chamber 70 and then recycled back into a gas cushion 42 after passing through a powered blower 63. This substantially reduces the amount of blower power required by the ship. Use of water agitating means such as a hydrofoil 64 aids in the separation of the entrained gas from the water. This largely takes place in the separation chamber 70. A gas duct 66 directs the separated gas to the powered blower 63. Note that two blowers 62, 38 are used in series forward. This is because of the great cushion gas pressures required on large ACES. These can be as great as 20 feet of water pressure which means that the gas cushion pressure pushes the water down 20 feet. This can normally best be accomplished by use of the blowers 62, 38 acting in series. These blowers 62, 33 are actually acting as just makeup gas blowers as the majority of gas comes from the gas separation chamber. Note that the recycle blower 63 only requires one blower and hence the saving in blower power requirements. Applicant's calculations indicate that overall blower power can be reduced by as much as 75 percent by using this recycling of cushion gas in this manner.

FIG. 23 also shows water deflector devices 65 that are acted on by bow waves passing from forward to aft in the gas cushion 42. This bow wave action gives substantial additional lift to the ACES at low to medium speeds. Note that the gas cushion 42 remains as a single unit even though the water deflector(s) 65 are in place in this preferred embodiment of the instant invention. Direction of gas flow is shown by gas flow arrows 71.

FIG. 24 is a transverse cross-section, as taken through line 24—24 of FIGS. 22 and 23, that shows a preferred disposition of a water deflector(s) 65 as inset into a gas cushion recess 41.

FIG. 25 is a transverse cross-section, as taken through line 25—25 of FIGS. 22 and 23, that illustrates a gas separation chamber 70 and hydrofoil 64 that is used to upset or agitate water and direct same into the gas separation chamber to thereby help separate entrained air from the water below the gas cushion. The agitated or active waterline 31 inside the separation chamber 70 indicates the effect of a gas separation assistance means such as the preferably airfoil shaped hydrofoil 64 used to illustrate the effect here. Other devices than hydrofoil members can, of course, be used to accomplish the same purpose. However other devices would normally be considered to have more drag than the hydrofoil. It is important to realize the depth of the entrained gas or air in the water below a gas cushion 42 in an ACES or other air cushion supported marine vehicle. In a standard ACES or Surface Effect Ship (SES) of about 100 feet in length where the gas cushion pressure is about three feet of water pressure, the depth of majority of the entrained air in the water would be about six inches. Imagine now a 1000-foot ACES with a gas cushion pressure of about 18 feet of water pressure. The depth of entrained water would be at least several orders of magnitude greater. As such, a water agitating means such as the hydrofoil 64 illustrated here would probably have at least a portion of itself set at least a foot below the level of water in the gas cushion recess with two feet better and three feet yet a more favorable number.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved marine vehicle that is partially supported by one or more artificially pressurized gas cushions, the improvement comprising:

gas collection means to collect gas that escapes from at least one artificially pressurized gas cushion while said gas is still at least partially pressurized, means to repressurize said escaped gas back to gas cushion pressure levels by artificial pressurizing means, an means to recycle the now repressurized gas back to at least one artificially pressurized gas cushion and wherein a gas cushion seal at least partially separates at least one artificially pressurized gas cushion from the gas collection means.

2. The improved marine vehicle of claim 1 wherein the gas collection means includes a gas separation chamber to separate, at least partially, gas from water.

3. The improved marine vehicle of claim 2 which further comprises structural means to agitate the fluid in or proximal to the gas separation chamber and thereby aid the separation of gas from water.

4. The improved marine vehicle of claim 3, where said structural means to agitate the fluid in or proximal to he gas separation chamber is, at least in part, hydrofoil shaped.

5. The improved marine vehicle of claim 1 which further comprises a second gas seal disposed, at least in its majority, aft of said gas collection means.

6. The improved marine hide of claim 1 which further comprises water deflector means disposed, at leas in part, in at least one artificially pressurized gas cushion.

7. The improved marine hide of claim 6 wherein said water deflector, at least over a portion of its fore to length, angles downward.

8. The improved marine hide of claim 1 which further comprises an aft stabilizer that extends outward from a side of the improved marine vehicle and is disposed aft of at least a majority of at least one artificially pressurized gas cushion and, at least in part, below an underwater side portion of the improved marine vehicle that tapers inward going aft.

9. The improved marine vehicle of claim 1 which further comprises a stern bustle in mechanical communication with said improved marine vehicle wherein, when the improved marine vehicle is moving forward, fluid flowing from an underside of the vessel, starting at a portion at least in its majority aft of at least one artificially pressurized gas cushion, adheres to a shape of the stern bustle going aft thereby adding a forward force due to the forward acting pressure of the fluid on the improved marine vehicle.

10. The improved marine vehicle of claim 9 wherein said stern bustle may taper inward going aft.

11. The improved marine vehicle of claim 9 wherein said stern bustle may be truncated at its aft end.

12. The improved marine vehicle of claim 9 wherein said stem bustle rises, going from forward to aft, by an average angle of less than eighteen degrees when the marine vehicle is in forward operation.

13. The improved marine vehicle of claim 9 wherein said stem bustle rises, going from forward to aft, by an average angle of less than nine degrees when the marine vehicle is in forward operation.

14. The improved marine vehicle of claim 9 wherein said stem bustle rises, going from forward to aft, by an average angle of less than twelve degrees when the marine vehicle is in forward operation.

15. The improved marine vehicle of claim 1 which further comprises a forward stabilizer that extends outward from a side of the improved marine vehicle and is disposed, at least in part, below a side portion of the improved marine vehicle that tapers inward going forward from said forward stabilizer toward a bow of said improved marine vehicle.

16. The improved marine vehicle of claim 1 which further comprises a retractable fin wherein said retractable fin is deployable outward from a lower and forward of midship side portion of said improved marine vehicle.

17. The improved marine vehicle of claim 1 wherein said improved marine vehicle has more than one hull.

18. The improved marine vehicle of claim 1 which further comprise a waterjet propulsor wherein said waterjet propulsor's water inlet is disposed, at least in its majority, in a side surface of said improved marine vehicle wherein said side surface is, on average as seen in vertical transverse planes of the improved marine vehicle, more vertical than horizontal.

19. The improved marine vehicle of claim 18 wherein said waterjet propulsor's water inlet takes in, on average, less than twenty percent of a thickness of a boundary layer of said improved marine vehicle proximal to said waterjet propulsor's water inlet.

20. The improved marine vehicle of claim 18 wherein said waterjet propulsor's water inlet takes in, on average, less than thirty percent of a thickness of a boundary layer of said improved marine vehicle proximal to said waterjet propulsor's water inlet.

21. The improved marine vehicle of claim 18 wherein said waterjet propulsor's water inlet takes in, on average, less than fifty percent of a thickness of a boundary layer of said improved marine vehicle proximal to said waterjet propulsor's water inlet.

22. The improved marine vehicle of claim 1 wherein an aft underwater portion of said improved marine vehicle tapers inward going aft.

23. The improved marine vehicle of claim 22 wherein said aft underwater portion of of said improved marine vehicle tapers inward going aft over at least fifteen percent of a waterline length of said improved marine vehicle.

24. The improved marine vehicle of claim 22 wherein said aft underwater portion of said improved marine vehicle tapers inward going aft over at least twenty-five percent of a waterline length of said improved marine vehicle.

25. The improved marine vehicle of claim 22 wherein said aft underwater portion of said improved marine vehicle tapers inward going aft over at least thirty-five percent of a waterline length of said improved marine vehicle.

26. In an improved marine vehicle that is partially supported by one or more artificially pressurized gas cushions, the improvement comprising:
   a stern bustle in mechanical communication with said improved marine vehicle wherein, when the improved marine vehicle is moving forward, fluid flowing from an underside of the vessel, starting at a position at least in its majority aft of at least one artificially pressurized gas cushion, adheres to a shape of the stern bustle going aft thereby adding a forward force due to the forward acting pressure of the fluid on the improved marine vehicle and wherein said stern bustle rises, going from forward to aft, by an average angle of less than eighteen degrees when the marine vehicle is in forward operation.

27. The improved marine vehicle of claim 26 wherein said stern bustle may taper inward going aft.

28. The improved marine of claim 26 wherein stern bustle may be truncated at its aft end.

29. The improved marine vehicle of claim 26 wherein said stern bustle rises, going from forward to aft, by an average angle of less than twelve degrees when the marine vehicle is in forward operation.

30. The improved vehicle of claim 26 wherein said stern bustle rises, going from forward to aft, by an average angle of less than nine degrees when the marine vehicle is forward operation.

31. The improved marine vehicle of claim 26 which further comprises gas collection means to collect gas that escapes from at least one artificially pressurized gas cushion while said gas is still at least partially pressurized, means to repressurize said escaped gas back to gas cushion pressure levels by artificial pressurizing means, and means to recycle the now repressurized gas back to at least one artificially pressurized as cushion and wherein a gas cushion seal at least partially separates at least one artificially pressurized gas cushion from the gas collection means.

32. The improved marine vehicle of claim 31 wherein the gas collection means includes a gas separation chamber to separate, at least partially, gas from water.

33. The improved marine vehicle of claim 32 which further comprises structural means to agitate the fluid in or proximal to the gas separation chamber and thereby aid the separation of gas from water.

34. The improved marine vehicle of claim 33 where said structural means to agitate the fluid in or proximal to he gas separation chamber is, at least in part, hydrofoil shaped.

35. The improved marine vehicle of claim 31 which further comprises a second gas seal disposed, at least in its majority, aft of aid gas collection means.

36. The improved marine vehicle of claim 26 which further comprises water deflector means disposed, at least in part, in at least one artificially pressurized gas cushion.

37. The improved marine vehicle of claim 36 wherein said water deflector, at least over a portion of its fore to aft length, angles downward.

38. The improved marine vehicle of claim 26 which further comprises an aft stabilizer that extends outward from a side of the improved marine vehicle and is disposed aft of at least a majority of at least one artificially pressurized gas cushion and, at least in part, below an underwater side portion of the improved marine vehicle that tapers inward going aft.

39. The improved marine vehicle of claim 26 which further comprises a forward stabilizer that extends outward from a side of the improved marine vehicle and is disposed, at least in part, below a side portion of the improved marine vehicle that tapers inward going forward from said forward stabilizer toward a bow of said improved marine vehicle.

40. The improved marine vehicle of claim 26 which further comprises a retractable fin wherein said retractable fin is deployable outward from a lower and forward of midship side portion of said improved marine vehicle.

41. The improved marine vehicle of claim 26 wherein said improved marine vehicle has more than one hull.

42. The improved marine vehicle of claim 26 which further comprise a waterjet propulsor wherein said waterjet propulsor's water inlet is disposed, at least in its majority, in a side surface of said improved marine vehicle wherein said side surface is, on average as seen in vertical transverse planes of the improved marine vehicle, more vertical than horizontal.

43. The improved marine vehicle of claim 42 wherein said waterjet propulsor's water inlet takes in, on average, less than twenty percent of a thickness of a boundary layer of said improved marine vehicle proximal to said waterjet propulsor's water inlet.

44. The improved marine vehicle of claim 42 wherein said waterjet propulsor's water inlet takes in, on average, less than thirty percent of a thickness of a boundary layer of said improved man vehicle proximal to said waterjet propulsor's water inlet.

45. The improved marine vehicle of claim 42 wherein said waterjet propulsor's water inlet takes in, on average, less than fifty percent of a thickness of a boundary layer of said improved marine vehicle proximal to said waterjet propulsor's water inlet.

46. The improved marine vehicle of claim 26 wherein an aft underwater portion of said improved marine vehicle tapers inward going aft.

47. The improved marine vehicle of claim 46 wherein said aft underwater portion of said improved marine vehicle tapers inward going aft over at least fifteen percent of a waterline length of said improved marine vehicle.

48. The improved marine vehicle of claim 46 wherein said aft underwater portion of said improved marine vehicle tapers inward going aft over at least twenty-five percent of a waterline length of said improved marine vehicle.

49. The improved marine vehicle of claim 46 wherein said aft underwater portion of said improved marine vehicle tapers inward going aft over at least thirty-five percent of a waterline length of said improved marine vehicle.

50. In an improved main vehicle that is partially supported by one or more artificially pressurized gas cushions, the improvement comprising:

aft stabilizers that extend outward from either side of the improved marine vehicle and are disposed forward of a stern of and aft of at least a majority of at least one artificially pressurized gas cushion and, at least in part, below an underwater side portion of the improved marine vehicle that tapers inward going aft.

51. The improved marine vehicle of claim 50 wherein said aft stabilizers are, at least partially, airfoil shaped.

52. The improved marine vehicle of claim 50 wherein said aft stabilizers are, at least in part, moveable in relation to improved marine vehicle.

53. The improved marine vehicle of claim 50 which further comprises a forward stabilizer that extends outward from a side of the improved marine vehicle and is disposed, at least in part, below a side portion of the improved marine vehicle that tapers inward going forward from said forward stabilizer toward a bow of said improved marine vehicle.

54. The improved marine vehicle of claim 50 which further comprises a retractable fin wherein said retractable fin is deployable outward from a lower and forward of midship side portion of said improved marine vehicle.

55. The improved marine vehicle of claim 50 wherein said improved marine vehicle has more than one hull.

56. In an improved marine vehicle that is partially supported by one or more artifically pressurized gas cushions, the improvement comprising:

an aft stabilizer extends outward from and, at least in part, below an aft underwater side portion of said improved marine vehicle wherein said aft underwater side portion of said improved marine vehicle tapers inward going aft over at least fifteen percent of the waterline length of said improved marine vehicle and wherein said aft stabilizer is, at least in part, moveable in relation to the advanced marine vehicle.

57. The improved marine vehicle of claim 56 wherein said aft underwater portion of said improved marine vehicle tapers inward going aft over at least twenty-five percent of a waterline length of said improved marine vehicle.

58. The improved marine vehicle of claim 56 wherein said aft underwater portion of said improved marine vehicle tapers inward going aft over at least thirty-five percent of a waterline length of said improved marine vehicle.

59. In an improved marine vehicle that is partially supported by one or more artifically pressurized gas cushions, the improvement comprising:

a waterjet propulsor wherein said waterjet propulsor's water inlet is disposed, at least in its majority, in an underwater side surface of said improved marine vehicle wherein said side surface is, on average as seen in vertical transverse planes of the improved marine vehicle, more vertical than horizontal and wherein said underwater side portion of said improved marine vehicle tapers inward going aft over at least thirty-five percent of a waterline length of said improved marine vehicle.

60. The improved marine vehicle of claim 59 wherein said waterjet propulsor's water inlet takes in, on average, less than twenty percent of a thickness of a boundary layer of said improve marine vehicle proximal to said waterjet propulsor's water inlet.

61. The improved marine vehicle of claim 59 wherein said waterjet propulsor's water inlet takes in, on average, less than thirty percent of a thickness of a boundary layer of said improved marine vehicle proximal to said waterjet propulsor's water inlet.

62. The improved marine vehicle of claim 59, wherein said waterjet propulsor's water inlet takes in, on average, less than fifty percent of a thickness of a boundary layer of said improved marine vehicle proximal to said waterjet propulsor's water inlet.

63. The improved marine vehicle of claim 59 wherein said underwater side portion of said improved marine vehicle tapers inward going aft over at least fifteen percent of a waterline length of said improved marine vehicle.

64. The improved marine vehicle of claim 59 wherein said underwater side portion of said improved marine vehicle tapers inward going aft over at least twenty-five percent of a waterline length of said improve marine vehicle.

65. The improved marine vehicle of claim 59 wherein said improved marine vehicle has more than one hull.

* * * * *